(12) United States Patent
Lefebvre et al.

(10) Patent No.: US 9,321,131 B2
(45) Date of Patent: Apr. 26, 2016

(54) METHOD FOR $CO_2$ LASER WELDING WITH A DYNAMIC JET NOZZLE

(75) Inventors: Philippe Lefebvre, Meulan (FR); Karim Chouf, Montmorency (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 605 days.

(21) Appl. No.: 13/120,673

(22) PCT Filed: Sep. 3, 2009

(86) PCT No.: PCT/FR2009/051663
§ 371 (c)(1),
(2), (4) Date: Mar. 24, 2011

(87) PCT Pub. No.: WO2010/034916
PCT Pub. Date: Apr. 1, 2010

(65) Prior Publication Data
US 2011/0174786 A1    Jul. 21, 2011

(30) Foreign Application Priority Data
Sep. 24, 2008 (FR) .................................. 08 56411

(51) Int. Cl.
*B23K 26/00* (2014.01)
*B23K 26/24* (2014.01)
(Continued)

(52) U.S. Cl.
CPC ............... *B23K 26/246* (2013.01); *B23K 26/08* (2013.01); *B23K 26/14* (2013.01); *B23K 26/147* (2013.01);
(Continued)

(58) Field of Classification Search
CPC ........... B23K 2203/20; B23K 15/0073; B23K 31/02; B23K 28/00; B23K 35/327; B23K 28/02; B23K 2201/185; B23K 26/0823; B23K 26/123; B23K 26/1405; B23K 26/1452; B23K 26/28; B23K 26/4075; B23K 26/422; B23K 26/38; B23K 2201/04; B23K 2201/36; B23K 37/0408; B23K 37/0443; B22F 7/08; F16J 9/26; F02B 77/02; C22C 32/0052; C23C 24/103
USPC .......................................... 219/121.6–121.86
See application file for complete search history.

(56) References Cited

U.S. PATENT DOCUMENTS 4,218,494 A * 8/1980 Belmondo et al. ............ 427/596
4,226,369 A * 10/1980 Botts et al. ........................ 241/1
(Continued)

FOREIGN PATENT DOCUMENTS

DE       101 24 35    11/2002
EP       1 920 872    5/2008
(Continued)

OTHER PUBLICATIONS

International Search Report for PCT/FR2009/051663, mailed Nov. 30, 2009.
(Continued)

*Primary Examiner* — David Angwin
*Assistant Examiner* — Gyounghyun Bae
(74) *Attorney, Agent, or Firm* — Elwood L. Haynes

(57) ABSTRACT

The invention relates to a method for the laser welding of metal parts that comprises generating a CO2 laser beam, dispensing a protection gas jet made of said gas or gas mixture in the direction of the junction plane between the parts, melting and evaporating the metal of the metal parts with the laser beam in order to generate a metal vapor capillary with the simultaneous generation of a metal plasma that propagates outside the metal vapor capillary and thus forms a metal plasma plume above said junction plane. The protection gas jet is further directed towards the metal plasma plume forming above the junction plane. The gas jet is preferably directed so that the latter comes flush with the top of the metal plasma plume and impinges on the part(s) at a location where the metal of said parts has not been molten by the beam.

7 Claims, 2 Drawing Sheets

(51) Int. Cl.
*B23K 26/08* (2014.01)
*B23K 26/14* (2014.01)
*B23K 26/32* (2014.01)

(52) U.S. Cl.
CPC ......... *B23K 26/1436* (2015.10); *B23K 26/1441* (2013.01); *B23K 26/244* (2015.10); *B23K 26/32* (2013.01); *B23K 26/322* (2013.01); *B23K 26/3206* (2013.01); *B23K 26/3213* (2013.01); *B23K 26/3293* (2013.01); *B23K 2201/34* (2013.01); *B23K 2203/02* (2013.01); *B23K 2203/08* (2013.01); *B23K 2203/50* (2015.10)

(56) References Cited

U.S. PATENT DOCUMENTS

| | | | | |
|---|---|---|---|---|
| 4,251,709 | A * | 2/1981 | Schumacher | 219/121.14 |
| 4,390,774 | A * | 6/1983 | Steen | B23K 26/083 219/121.6 |
| 5,038,016 | A * | 8/1991 | Robertson et al. | 219/121.83 |
| 5,045,668 | A * | 9/1991 | Neiheisel et al. | 219/121.83 |
| 5,045,669 | A * | 9/1991 | Ortiz et al. | 219/121.83 |
| 5,153,409 | A * | 10/1992 | Rudaitis et al. | 219/121.83 |
| 5,208,431 | A * | 5/1993 | Uchiyama et al. | 219/121.65 |
| 5,247,155 | A * | 9/1993 | Steen et al. | 219/121.83 |
| 5,618,454 | A * | 4/1997 | Freedenberg | B23K 26/04 219/121.74 |
| 5,977,515 | A * | 11/1999 | Uraki et al. | 219/121.84 |
| 6,111,214 | A * | 8/2000 | Saito | 219/121.63 |
| 6,294,754 | B1 * | 9/2001 | Nagura et al. | 219/121.63 |
| 6,388,227 | B1 * | 5/2002 | Dykhno et al. | 219/121.6 |
| 6,417,487 | B2 * | 7/2002 | Nagura et al. | 219/121.84 |
| 6,713,712 | B1 * | 3/2004 | Wildmann et al. | 219/121.63 |
| 7,693,696 | B2 * | 4/2010 | Forrest et al. | 703/7 |
| 7,820,939 | B2 * | 10/2010 | Mazumder et al. | 219/121.64 |
| 2003/0102294 | A1 * | 6/2003 | Kinbara et al. | 219/121.83 |
| 2003/0230556 | A1 * | 12/2003 | Briand et al. | 219/121.64 |
| 2003/0230558 | A1 * | 12/2003 | Briand et al. | 219/121.64 |
| 2003/0230559 | A1 * | 12/2003 | Briand et al. | 219/121.64 |
| 2004/0262269 | A1 * | 12/2004 | Matile | 219/121.46 |
| 2005/0011868 | A1 * | 1/2005 | Matile et al. | 219/121.64 |
| 2006/0278619 | A1 * | 12/2006 | Acker et al. | 219/121.67 |
| 2008/0116175 | A1 * | 5/2008 | Ballerini et al. | 219/74 |
| 2008/0296271 | A1 * | 12/2008 | Klein et al. | 219/121.64 |
| 2009/0050608 | A1 * | 2/2009 | Hayashi et al. | 219/121.14 |
| 2009/0050609 | A1 * | 2/2009 | Berger et al. | 219/121.64 |
| 2009/0183190 | A1 * | 7/2009 | Fukuda et al. | 720/695 |

FOREIGN PATENT DOCUMENTS

| | | |
|---|---|---|
| JP | H05 169288 | 7/1993 |
| JP | H06 182570 | 7/1994 |
| JP | H06 262377 | 9/1994 |
| JP | H09 220682 | 8/1997 |
| JP | 2002 263878 | 9/2002 |
| JP | 2004 195491 | 7/2004 |
| JP | 2005 349403 | 12/2005 |
| WO | WO 2006/050043 | 5/2006 |
| WO | WO 2006050043 A3 * | 7/2006 |

OTHER PUBLICATIONS

PCT/FR2009/051663 Written Opinion dated Nov. 30, 2009.
French Search Report for FR 0856411 dated Jun. 19, 2009.
Herrmann, J. "Düsenparameter und Prozessgasse für einen optimierten Laserschweissprozess," 4th Jena Laser Conference, Jena, Germany, Nov. 18-19, 2004, 8 pages; English translation.
European Search Report and Written Opinion for related EP 11 18 6432, Jan. 17, 2012.
European Search Report and Written Opinion for related EP 12 18 4825, Nov. 8, 2012.

* cited by examiner

METHOD FOR CO₂ LASER WELDING WITH A DYNAMIC JET NOZZLE

CROSS-REFERENCE TO RELATED APPLICATIONS

This application is a §371 of International PCT Application PCT/FR2009/051663, filed Sep. 3, 2009, which claims §119(a) foreign priority to French patent application 0856411, filed Sep. 24, 2008.

BACKGROUND

1. Field of the Invention

The present invention relates to a laser welding method employing a $CO_2$ laser generator to generate the welding laser beam and a protective gas free of helium or containing only a low proportion of helium.

2. Related Art

Laser beam welding is a highly efficient joining method because it serves to obtain very high penetration depths at high speeds, in comparison with other more conventional processes, such as plasma welding, MIG (Metal Inert Gas) welding or TIG (Tungsten Inert Gas) welding.

This is because of the high power densities employed when one or more mirrors or lenses are used to focus the laser beam on the junction plane of the parts to be welded, for example power densities up to more than $10^6$ W/cm².

These high power densities cause a strong metal vaporization at the surface of the parts to be welded which, by expanding outwardly, causes a progressive hollowing of the metal pool and leads to the formation of a narrow and deep vapor capillary called "keyhole" in the thickness of the parts, that is, at the junction plane. Said capillary allows the direct deposition of the laser beam energy deep in the thickness of the parts, as opposed to more conventional arc welding processes, in which the energy deposition takes place at the surface.

The vapor capillary consists of a mixture of metal vapors and metal vapor plasma, which has the property of absorbing the laser beam and therefore trapping the energy in the capillary itself.

The propagation of the metal plasma outside the capillary generates a hot and radiant metal plasma plume.

A known problem in laser welding employing a $CO_2$ laser device generating a laser beam with a wavelength of 10.6 μm is the formation of an undesirable plasma in the blanket gas or protective gas.

This is because, by seeding the blanket gas or protective gas with free electrons, the metal vapor plasma can initiate an ionization therein. The ionization of the blanket gas can be maintained by the incident laser beam, leading to the formation of a large plasma in the blanket gas just above the metal plasma plume.

In fact, this undesirable plasma in the protective gas strongly absorbs the incident laser beam, and this is detrimental to the welding operation. Said mechanism of undesirable plasma generation in the protective gas is known by the name of "inverse Bremsstrahlung". The incident laser beam may then be strongly disturbed by the blanket gas plasma.

The interaction of the blanket gas plasma with the laser beam may assume various forms, but is usually demonstrated by an effect of absorption and/or diffraction of the incident laser beam, which may substantially reduce the effective laser power density on the surface of the target, causing a decrease in the depth of penetration, or even a coupling failure between the beam and the material, and hence a temporary interruption of the welding process.

The power density threshold above which the plasma appears depends on the ionization potential of the blanket gas used, and is inversely proportional to the square of the laser beam wavelength. Thus, it is very difficult to weld under pure argon with a $CO_2$ laser generator, whereas this operation is feasible with far fewer problems with a YAG laser generator.

In general, in laser welding with a $CO_2$ laser generator, the blanket gas used is helium, which has a high ionization potential and which helps prevent the appearance of the blanket gas plasma, up to laser densities of at least 45 kW.

However, helium has the drawback of being a costly gas, and many laser users prefer to use other gases or gas mixtures which are less expensive than helium but which nevertheless help limit the appearance of the blanket gas plasma, and hence produce welding results similar to those obtained with helium but at lower cost.

Furthermore, L'Air Liquide™, under the trade name LASAL MIX™, sells gas mixtures containing nitrogen and helium or argon and helium, for obtaining substantially the same results as with pure helium, for $CO_2$ laser powers lower than 12 kW, the composition of the mixture concerned being selected or adjusted according to the operating parameters, the laser beam and the material to be welded.

However, these gas mixtures also contain a high proportion of helium, which is not ideal, especially from the economic standpoint.

Accordingly, a problem that arises is to perform a welding operation by laser beam delivered by a $CO_2$ laser generator to generate the welding laser beam, and a protective gas preferably free of helium or containing only a small proportion of helium, that is, much lower than 50% by volume of helium, serving to obtain a weld penetration at least equivalent to that of a laser welding process carried out under the same operating conditions but using helium or a gas containing a high proportion of helium as protective gas, that is, over 50% by volume of helium, and/or which generates little or no plasma in the blanket gas, and preferably regardless of the power (up to about 20 kW) and the focusing conditions of the incident laser beam, and/or which does not lead to a deterioration of the weld quality, in terms of appearance and metallurgical quality (pores, etc.) in the weld bead.

SUMMARY OF THE INVENTION

A solution of the invention is accordingly a method for the laser welding of one or more metal parts positioned against one another along a junction plane, in which:

a) a laser beam is generated using a $CO_2$ laser generator, b) a nozzle is fed with a gas or a gas mixture and said nozzle is used to send a jet of protective gas formed from said gas or gas mixture toward the junction plane, c) a laser beam is used to melt or vaporize the metal of the metal parts, leading to the formation of a metal vapor capillary in the thickness of the part or parts and at said junction plane, with the simultaneous formation of a metal plasma which, by propagating outside the metal vapor capillary, forms a metal plasma plume above the junction plane, characterized in that the protective gas jet delivered by the nozzle is directed or sent toward the metal plasma plume being formed above the junction plane, so that it is flush with the top of the metal plasma plume and impinges on a part or the parts at a place where the metal of the parts has not been melted by the beam, that is, that the gas jet will impinge on the upper surface of the parts which faces the laser head.

In the context of the present invention, $CO_2$ laser generator means a device or an energy source for generating a laser beam having a wavelength of about 10.6 μm, while "one or more metal parts" means two separate metal parts, or a single part within itself, for example the two longitudinal edges of a metal sheet shaped into an O, and then welded in order to obtain a welded tube, or even two elements of a single part which are welded together.

Depending on the case, the inventive method may comprise one or more of the following features:
- the protective gas comprises a proportion of helium lower than 35% by volume, preferably lower than 25% by volume of helium, even preferably lower than 15% by volume of helium, preferably lower than 10% by volume of helium, even more preferably lower than 5% by volume of helium,
- the protective gas is free of helium,
- in step c), the metal of the metal parts is melted and vaporized progressively by a relative movement of the beam with regard to the parts to be welded, all along the junction plane,
- the gas jet is directed so that the distance (D) between the axis of said gas jet and the axis of the laser beam, measured between the impact points of said gas jet and said laser beam on the upper surface of the parts to be welded, is equal to or higher than 1.5 times the inside diameter (D') of the nozzle delivering the gas jet,
- the end of the inside diameter of the nozzle (D') is positioned with regard to the upper surface of the parts at a height of 1 mm to 50 mm,
- the nozzle is positioned with regard to the upper surface of the parts so that the angle (θ) of the axis of the gas jet or of the nozzle is between 5° and 70° with regard to the upper surface of the parts, preferably about 30° to 50°,
- the nozzle is positioned with regard to the junction plane so that the angle of inclination (α) of the axis of the weld bead to the projection of the axis of the nozzle in the plane of the plate to be welded is between +170° and −170°,
- the gas jet is distributed at a speed of 40 to 2000 m/s and/or at a pressure between 1 and 10 bar,
- the nozzle has one or more gas distribution orifices,
- the nozzle has an inside diameter (D') of 0.5 mm to 20 mm, preferably between 2 and 4 mm,
- the gas or gas mixture contains one or more components of the group formed by Ar, $N_2$, $CO_2$ and $O_2$, and optionally He,
- the part or parts is (are) of aluminum or aluminum alloy, titanium or titanium alloy, magnesium or magnesium alloy, Inconel, carbon steel or stainless steel, in particular steel plated with zinc, aluminum alloy, polymer or a plurality of organic elements, in particular paint,
- the part or parts to be welded has (have) a thickness of 0.1 to 20 mm, depending on the application concerned, preferably between 1 and 10 mm,
- for thick plates, that is at least 8 mm thick, various edge preparations may be considered, such as the making of particular bevels, root faces, etc. In the latter case, the thickness of the root face must lie within the range of thicknesses between 0.1 mm and 20 mm, preferably between 1 and 10 mm,
- the laser power is at least 2 kW, preferably between 4 kW and 12 kW.

BRIEF DESCRIPTION OF THE FIGURES

FIG. 1 illustrates that a gas jet is sent in the neighborhood of the metal plasma plume 1 so as to be flush with the top of the metal plasma plume 1, that is the apex of the plasma plume 1

FIGS. 2 and 3 illustrate angular and positional relationships of components and materials that define certain embodiments of the invention.

The following description of an embodiment of the invention is provided with reference to the appended illustrative figures and the examples given below.

Figure 1:
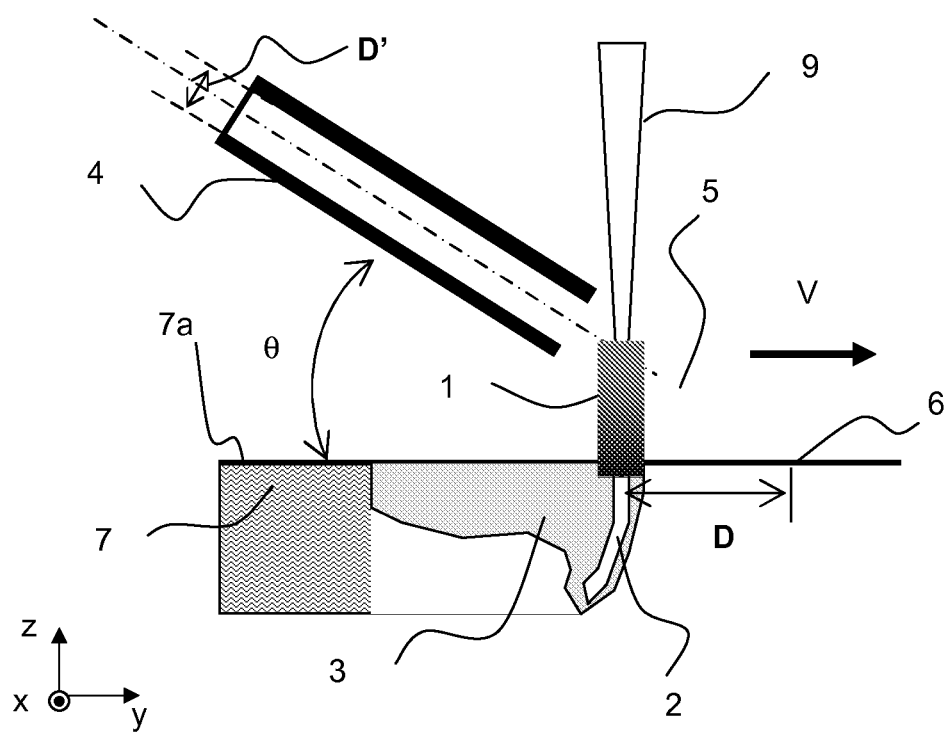
FIGS. 1 to 3 show the principle of a laser welding method according to an embodiment of the invention, in which two separate metal parts 7 are welded together.
Figure 2:
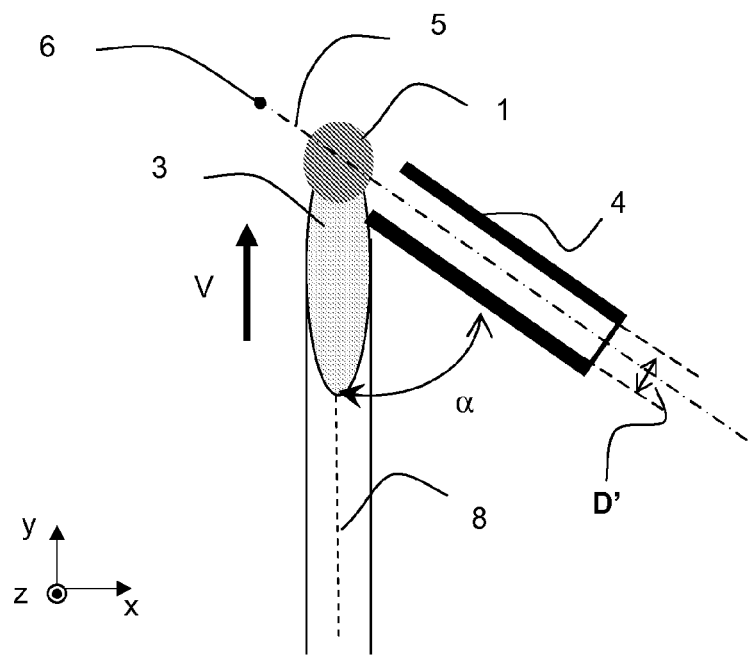
Figure 3:
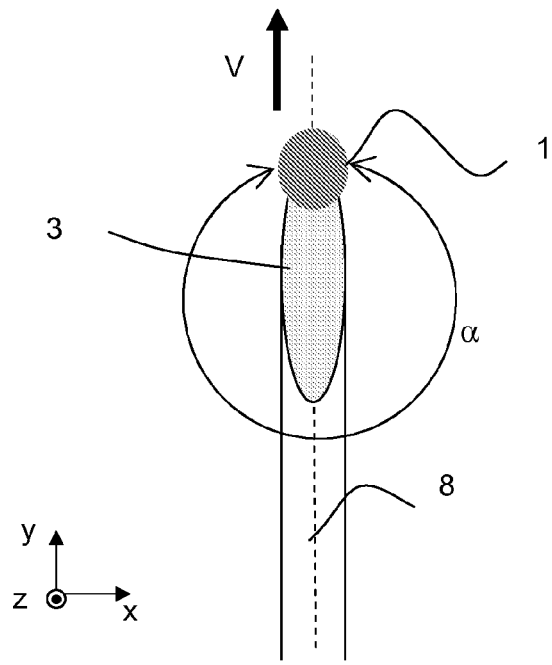

FIGS. 1 to 3 show the principle of a laser welding method according to an embodiment of the invention, in which two separate metal parts 7 are welded together. The parts 7 to be welded are first positioned against one another to obtain a junction plane 8 that will be struck by the laser beam 9 to melt the metal which then resolidifies to produce a weld bead.

DETAILED DESCRIPTION OF THE INVENTION

Conventionally, the laser beam 9 is obtained using a $CO_2$ laser generator and then conveyed, via an optical path, to a focusing tube comprising one or more optical focusing devices, such as optical lenses or mirrors, designed to focus the beam in the thickness of the parts 7 to be welded, at their junction plane 8.

A protective gas or gas mixture is sent, via a gas distribution nozzle 4, toward the welding zone, that is the zone of the junction plane where the laser beam interacts with the melting metal 3, in order to provide gaseous protection there and to prevent the contamination of the weld pool and hence of the resulting weld bead, by impurities in the air.

In fact, the laser beam 9 strikes the parts 7 to be welded and causes the melting or vaporization of part of the metal of the metal parts 7, leading to the formation of a metal vapor capillary 2 or keyhole in the thickness of part 7 and at said junction plane 8, with the simultaneous formation of a metal plasma.

Said metal plasma, by propagating outside the metal vapor capillary 2, forms a metal plasma plume 1 above the junction plane 8 and hence above the melt pool 3.

According to an embodiment of the invention, the nozzle 4, that is its axis 5, is oriented so that the gas jet that it delivers is directed toward the metal plasma plume 1 being formed above the junction plane 8 but impinges on the upper surface 7a of one or more plates 7 at a place 6 where the metal is not melted.

In fact, one role of said nozzle 4 is to generate a rapid gas stream or jet, oriented so as to avoid directly influencing the welding process, such as the capillary 2, metal pool 3 or the metal plasma plume 1. This gas jet is sent in the neighborhood of the metal plasma plume 1 so as to be flush with the top of the metal plasma plume 1, that is the apex of the plasma plume 1, as shown in FIG. 1.

In other words, the gas jet employed in the invention is not intended to act on the metal plasma and/or the projected particles, but on the undesirable effect of the plasma in the protective gas, which corresponds to the breakdown mechanism. The gas jet therefore serves to limit this undesirable effect. The nozzle blows the protective gas plasma and not the welding plasma.

More precisely, the rapid gas jet is intended to limit the seeding of the blanket gas with free electrons, which could initiate the appearance of an undesirable plasma therein, said undesirable plasma being detrimental to the welding operation because it would absorb part of the energy of the incident laser beam 9, and this would be harmful to the laser welding process.

The protective gas particles ionized by the metal plasma plume 1 are entrained by the gas delivered by the nozzle 4, outside the laser beam zone. In this way, the inverse Bremsstrahlung mechanism cannot take place and no harmful undesirable plasma is formed above the metal plasma plume 1.

Preferably, the distance D between the axis 5 of the gas jet or of the nozzle 4, and the axis of the laser beam, must be at least equal to 1.5 times the inside diameter D' of the nozzle 4, as shown in FIG. 1.

The orientation of the gas jet, hence of the nozzle 4 along its axis 5, is not necessarily in the axis of the weld bead 8, that is, parallel to the welding direction V. In fact, the gas jet may arrive sideways, as shown in FIG. 2, or with any orientation along an angle $\alpha$ to the axis of the weld bead. The only condition to be satisfied is to ensure that the gas jet does not interact with the melt pool 3.

The angle ($\alpha$) between the weld bead axis and the projection of the nozzle axis in the plane of the plate to be welded (FIG. 2) must be between +170° and −170° and preferably between +150° and −150°. It is preferable for this angle value to be fixed during the laser welding process. Ideally, the value of this angle must be close to 0, which means that the impact point of the gas jet coincides with the presumed trajectory of the laser beam.

The angle of inclination $\theta$ of the nozzle 4 to the surface of the plate or plates 7 is between 5° and 70°, preferably 40° to 50°.

The height of the bottom part of the nozzle from the surface of the plate or plates is between about 1 and 50 mm, preferably at least 4 mm and/or not more than 10 mm, preferably not more than 8 mm.

The shape of the outlet section of the nozzle 4 is immaterial, for example it may be round, ovoid, square, rectangular, trapezoidal, etc. However, a cylindrical nozzle with a circular outlet section is preferred.

The nozzle may comprise a plurality of gas outlet orifices. The inside diameter of the nozzle used is advantageously between 0.5 mm and 20 mm, preferably at least 1 to 2 mm and not more than 10 mm, preferably not more than about 4 mm, measured at the outlet end of the nozzle 4 through which the gas exits.

The speed of the gas at the nozzle outlet must be between 40 and 2000 m/sec, preferably at least about 100 to 150 m/sec and/or no more than 500 m/sec, preferably no more than 250 m/sec. The gas pressure must be between about 1 bar and 10 bar, preferably between 2 bar and 5 bar, preferably not more than about 4 bar.

Thanks to the inventive method, it is now possible to use protective gases other than helium, in particular when the laser device used to generate the beam is of the $CO_2$ type and regardless of the power and the focusing conditions of the incident laser beam employed, in particular for laser powers lower than 45 kW, preferably lower than 20 kW.

Thus, suitable gases or gas mixtures may be formed of or contain one or more of the following components: Ar, $N_2$, $O_2$, $CO_2$ and optionally also a low proportion of helium, even though the inventive method operates perfectly without helium.

However, it should be observed that oxidizing gases such as $H_2$, $CH_4$, etc. cannot be used in mixtures with the above-mentioned gases, above their detonation and inflammability thresholds, for obvious safety reasons.

EXAMPLES

Tests intended to check the effectiveness of the laser welding method of the invention were performed with a $CO_2$ laser generator, delivering a power up to 12 kW and focused by a parabolic copper mirror with a focal length of 250 mm, and using a cylindrical nozzle with an inside diameter of 2 mm.

The nozzle/parts distance was about 6 mm and its inclination (angle $\theta$) about 45°. The axis of the nozzle distributing the gases was positioned in front of the impact point of the laser beam on the junction plane ($\alpha$=0) at a distance of 3 mm, as shown in FIG. 1.

The parts were laser-welded with each of the following gases:
Ar delivered at 15 l/min, 30 l/min and 45 l/min
$N_2$ delivered at 15 l/min, 30 l/min and 45 l/min
$CO_2$ delivered at 15 l/min, 30 l/min and 45 l/min
and, for comparison, with helium delivered at 30 l/min by a conventional prior art method, that is, using a conventional cylindrical nozzle with an inside diameter of 10 mm, oriented at 45° to the surface of the plate and whose axis coincides with the impact point of the focused laser beam.

The welding tests were performed on several types of positioned parts, but welded edge to edge, according to the examples below.

In all cases, the protective gas jet was sent by the nozzle toward the metal plasma plume being formed above the junction plane between the parts to be welded together.

Example 1

Galvanized Plates of Different Thicknesses

The steel parts plated with a surface layer of zinc were welded in a welding configuration commonly used in the manufacture of car bodies, called a "tailored blank" configuration.

More precisely, the sides of the plates were positioned edge to edge with a limited clearance between the parts.

The plate thicknesses may be identical or different.

The tests were first performed on 2 plates of different thicknesses (1.9 mm and 0.7 mm) positioned edge to edge, and then welded using:
a laser power of 6 kW,
a welding speed of 5 m/min,
a tubular nozzle having an inclination of 45° to the surface of the plates, and
the impact of the axis of the gas jet was about 4 mm in front of the beam impact point ($\alpha$=0).

Example 2

Galvanized Plates of the Same Thickness

The conditions of the tests performed in Example 2 were similar to those of Example 1, except that:
the two plates had the same thickness of 1.2 mm each, and
the welding speed was 6.5 m/min.

Example 3

Steel Tube

In this Example 3, the welding was carried out on a 2 mm thick stainless steel plate, shaped into a pre-tube by joining their longitudinal edges in order to obtain an O cross section, and subsequent welding of these edges together to obtain a welded tube. The edges of the plate are hence juxtaposed in an edge-to-edge configuration with a clearance and a limited height misalignment, before being welded together.

The conditions of these tests were:
laser power 5 kW,
welding speed 4 m/min,
tubular nozzle having an inclination of 45° to the surface of the plates,
the impact of the axis of the gas jet was about 6 mm in front of the laser beam impact point (α=0).

The results were confirmed by positioning the impact of the axis of the gas jet on the lateral solid portion, so that α=90°, at a distance of 6 mm. The results obtained were the same as for an orientation α=0.

Example 4

Painted 5 mm Thick Mild Steel Parts

In this Example 4, mild steel parts having the same thickness (5 mm), and painted, like those typically used for building ships in shipyards, were welded together.
The conditions of these tests were:
laser power 10 kW,
welding speed 2.5 m/min,
tubular nozzle having an inclination of 40° to the surface of the plates,
the impact of the axis of the gas jet was about 6 mm in front of the laser beam impact point (α=0).

The results were confirmed by positioning the impact of the axis of the gas jet on the lateral solid portion, so that α=90°, at a distance of 6 mm. The results obtained were the same in both orientations: α=0 and α=90°.

Example 5

Painted 8 mm Thick Mild Steel Parts

Example 5 is similar to Example 4, except that the parts had a thickness of 8 mm, implying a slight variation in some of the test conditions, that is:
welding speed 1.2 m/min, and
impact of the axis of the gas jet about 2.5 mm in front of the laser beam impact point.

The table below gives the results obtained in these tests by comparison with a laser welding performed with a standard process under helium, serving as a reference (legend: 0=equivalent result; 1=better result; 2=poorer result).

TABLE

| | | Gas at 30 l/min | Ex. 1 | Ex. 2 | Ex. 3 | Ex. 4 | Ex. 5 |
|---|---|---|---|---|---|---|---|
| 30 l/min | Weld bead quality top and underside | Ar | 0 | 0 | 0 | 0 | 0 |
| | | $CO_2$ | 0 | 0 | 0 | 0 | 0 |
| | | $N_2$ | 0 | 0 | 2 | 2 | 2 |
| | Black deposits on both sides of weld bead | Ar | 1 | 1 | 1 | 1 | 1 |
| | | $CO_2$ | 1 | 1 | 1 | 1 | 1 |
| | | $N_2$ | 1 | 1 | 2 | 2 | 2 |
| | Pores or blowholes in the weld bead | Ar | 0 | 0 | 0 | 0 | 0 |
| | | $CO_2$ | 0 | 0 | 0 | 0 | 0 |
| | | $N_2$ | 2 | 2 | 2 | 2 | 2 |
| | Weld penetration | Ar | 0 | 0 | 0 | 0 | 0 |
| | | $CO_2$ | 0 | 0 | 0 | 0 | 0 |
| | | $N_2$ | 0 | 0 | 0 | 0 | 0 |
| 30 l/min | Weld bead quality top and underside | Ar | 1 | 1 | 1 | 1 | 1 |
| | | $CO_2$ | 1 | 1 | 0 | 0 | 0 |
| | | $N_2$ | 0 | 0 | 2 | 2 | 2 |
| | Black deposits on both sides of weld bead | Ar | 1 | 1 | 1 | 1 | 1 |
| | | $CO_2$ | 1 | 1 | 1 | 1 | 1 |
| | | $N_2$ | 1 | 1 | 2 | 2 | 2 |

TABLE-continued

| | | | | | | | |
|---|---|---|---|---|---|---|---|
| | Pores or blowholes in the weld bead | Ar | 0 | 0 | 1 | 1 | 1 |
| | | $CO_2$ | 0 | 0 | 1 | 1 | 1 |
| | | $N_2$ | 2 | 2 | 2 | 2 | 2 |
| | Weld penetration | Ar | 0 | 0 | 0 | 0 | 0 |
| | | $CO_2$ | 0 | 0 | 0 | 0 | 0 |
| | | $N_2$ | 0 | 0 | 0 | 0 | 0 |

| | Gas at 15 l/min | Ex. 1 | Ex. 2 | Ex. 3 | Ex. 4 | Ex. 5 |
|---|---|---|---|---|---|---|
| | Gas at 40 l/min | Ex. 1 | Ex. 2 | Ex. 3 | Ex. 4 | Ex. 5 |
| 15 l/min | Ar | | | | | |
| | $CO_2$ | No effective laser-material coupling in the laser welding process | | | | |
| | $N_2$ | | | | | |

The surface of the weld beads obtained in the tests performed in the abovementioned examples with the gases tested (Ar, $N_2$, $CO_2$) at 30 l/min and 45 l/min was visually examined, and it was observed that the quality of the beads obtained with the inventive method, that is, the appearance of the beads on the top side and the underside, was equivalent (0) to that obtained with helium employed in a standard laser welding process (reference).

However, advantageously, the weld beads obtained with the inventive method had fewer black deposits (1) on either side of the weld bead than with the standard process using helium.

Furthermore, the macrography of the bead cross sections show that the weld sections are also identical (0) to the reference obtained with helium. In fact, the radiographs of the beads confirm the fact that the beads do not have more pores or blowholes in the beads than those obtained using the reference process with helium.

However, it should be emphasized that the use of nitrogen can have a slight influence on the metallurgy of the weld beads obtained under certain welding conditions.

In all cases, the weld penetration was also equivalent (0) to that obtained with helium using the standard process.

These tests demonstrate that a laser welding process with a high power $CO_2$ laser generator can be employed effectively with gases other than helium, without harming the quality and appearance of the weld beads obtained, nor the weld penetration, as tested successfully on various materials and weld configurations in the above examples.

A characteristic flow rate operating range of the invention does exist. Thus, for low flow rates, that is lower than about 20 l/min, the limitation of the ionization of the metal plasma plume to the gaseous environment is no longer effective. An undesirable plasma is formed above the metal plasma plume. Thus, the tests performed at the flow rate of 15 l/min confirmed this point. Under these conditions, the coupling between the laser beam and the material is no longer effective and the plates are not welded. This effect is independent of the type of gas employed. The flow rate is therefore a parameter that must be taken into account to further improve the results obtained in the implementation of the inventive method.

In fact, the use of a welding nozzle oriented according to the invention, that is in order to generate a rapid gas jet in the neighborhood of the metal plasma plume so as to be flush with the top of the metal plasma plume, serves to limit the seeding of the blanket gas with free electrons, and thereby prevent the appearance of an undesirable plasma that would be detrimental to the welding operation, because it would absorb a portion of the energy of the incident laser beam, and this would harm the laser welding process.

Accordingly, this serves to implement the welding process at high power, that is typically between 4 and 20 kW, using gases or gas mixtures which contain no helium or only a low proportion of helium, for example lower than about 20%, in particular, gases such as Ar, $N_2$, $CO_2$, $O_2$ and mixtures thereof.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the laser butt welding of one or more metal parts positioned against one another along a junction plane, in which:
    a) a laser beam is generated using a $CO_2$ laser generator,
    b) a nozzle is fed with a gas or a gas mixture and said nozzle is used to send a jet of protective gas formed from said gas or gas mixture toward a junction plane,
    c) a laser beam is used to melt or vaporize the metal of the metal parts, leading to the formation of a metal vapor capillary in the thickness of the part or parts and at said junction plane, with the simultaneous formation of a metal plasma which, by propagating outside the metal vapor capillary, forms a metal plasma plume above the junction plane,
    characterized in that the protective gas jet delivered by the nozzle is directed or sent toward the metal plasma plume being formed above the junction plane, wherein the protective gas jet is flush with the top of the metal plasma plume and impinges on a part or the parts at a place where the metal of the parts has not been melted by the beam, wherein the gas jet is directed so that the distance between the axis of said gas jet and the axis of the laser beam, measured between the impact points of said gas jet and said laser beam on the upper surface of the parts to be welded, is equal to or higher than 1.5 times the inside diameter of the nozzle delivering the gas jet.

2. The method of claim 1, wherein step c), the metal of the metal parts is melted and vaporized progressively by a relative movement of the beam with regard to the parts to be welded, all along the junction plane.

3. The method of claim 1, wherein the end of the inside diameter of the nozzle is positioned with regard to the upper surface of the parts at a height of 1 mm to 50 mm.

4. The method of claim 1, wherein the nozzle is positioned with regard to the junction plane so that the angle of inclination of the axis of the weld bead to the projection of the axis of the nozzle in the plane of the plate to be welded is between +170° and −170°.

5. The method of claim 1, wherein the nozzle is positioned with regard to the upper surface of the parts so that the angle of the axis of the gas jet or of the nozzle is between 5° and 70° with regard to the upper surface of the parts.

6. The method of claim 1, wherein the part or parts are made of steel plated with one or more of zinc, aluminum alloy, a polymer, or one or more organic elements.

7. The method of claim 1, wherein the gas or gas mixture contains helium with a concentration up to a maximum of 20% by volume.

* * * * *